(12) United States Patent  
Zheng et al.

(10) Patent No.: US 12,347,459 B2  
(45) Date of Patent: Jul. 1, 2025

(54) VIDEO FILE GENERATING METHOD AND DEVICE, TERMINAL, AND STORAGE MEDIUM

(71) Applicant: BEIJING BYTEDANCE NETWORK TECHNOLOGY CO., LTD., Beijing (CN)

(72) Inventors: Wei Zheng, Beijing (CN); Weiwei Lyu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 56 days.

(21) Appl. No.: 17/768,462

(22) PCT Filed: Sep. 21, 2020

(86) PCT No.: PCT/CN2020/116576  
§ 371 (c)(1),  
(2) Date: Apr. 12, 2022

(87) PCT Pub. No.: WO2021/073368  
PCT Pub. Date: Apr. 22, 2021

(65) Prior Publication Data  
US 2024/0296870 A1  Sep. 5, 2024

(30) Foreign Application Priority Data  
Oct. 14, 2019  (CN) .......................... 201910974857.6

(51) Int. Cl.  
*G11B 27/031* (2006.01)  
*G06F 3/0487* (2013.01)

(52) U.S. Cl.  
CPC .......... *G11B 27/031* (2013.01); *G06F 3/0487* (2013.01)

(58) Field of Classification Search  
USPC .................................................. 386/248, 285  
See application file for complete search history.

(56) References Cited

U.S. PATENT DOCUMENTS 5,191,319 A    3/1993  Kiltz  
6,697,564 B1 *  2/2004  Toklu ................. H04N 21/8456  
                                                  386/285  
(Continued)

FOREIGN PATENT DOCUMENTS

CN  107135419 A  9/2017  
CN  107749302 A  3/2018  
(Continued)

OTHER PUBLICATIONS

International Patent Application No. PCT/CN2020/116576; Int'l Search Report; dated Dec. 16, 2020; 2 pages.  
(Continued)

*Primary Examiner* — Nigar Chowdhury  
(74) *Attorney, Agent, or Firm* — BakerHostetler

(57) ABSTRACT

A method and an apparatus for generating a video file, a terminal, and a storage medium are provided. The method includes: presenting, in response to a received video editing instruction, a video editing interface; determining, in response to a clicking operation on a button in the video editing interface, a target audio and a target image for video synthesis; obtaining an audio parameter corresponding to each audio frame; generating a spectrogram corresponding to each audio frame based on the audio parameter; generating, based on the spectrogram and the target image, multiple video frame images that each corresponds to one of the audio frames and includes the spectrum corresponding to the one of the audio frames; and performing, based on the multiple video frame images and the target audio, video encoding to obtain a target video file.

17 Claims, 9 Drawing Sheets

(56) References Cited

U.S. PATENT DOCUMENTS

| | | | |
|---|---|---|---|
| 8,027,743 B1* | 9/2011 | Johnston | G10L 21/0208 700/94 |
| 9,147,166 B1* | 9/2015 | Drame | G06F 3/165 |
| 9,158,842 B1* | 10/2015 | Yagnik | G06F 16/683 |
| 9,373,320 B1* | 6/2016 | Lyon | H04N 21/4394 |
| 9,514,722 B1* | 12/2016 | Kim | G10H 1/368 |
| 9,679,042 B2* | 6/2017 | Vlack | G06F 16/683 |
| 9,953,224 B1* | 4/2018 | Wills | G11B 27/031 |
| 10,129,658 B2* | 11/2018 | Rubinstein | G01H 9/002 |
| 10,149,958 B1* | 12/2018 | Tran | G16H 50/20 |
| 10,236,006 B1* | 3/2019 | Gurijala | G10L 19/02 |
| 10,380,164 B2* | 8/2019 | Raichelgauz | H04N 7/17318 |
| 10,437,791 B1* | 10/2019 | Bebchuk | G06F 16/1734 |
| 10,685,488 B1* | 6/2020 | Kumar | A61H 23/04 |
| 10,816,939 B1* | 10/2020 | Coleman | G01S 17/86 |
| 10,841,724 B1* | 11/2020 | Tran | G06F 3/013 |
| 10,848,590 B2* | 11/2020 | Raichelgauz | H04L 67/306 |
| 10,891,723 B1* | 1/2021 | Chung | G06N 3/088 |
| 10,931,976 B1* | 2/2021 | Joze | G11B 27/036 |
| 11,604,847 B2* | 3/2023 | Raichelgauz | G06N 7/01 |
| 2007/0291958 A1* | 12/2007 | Jehan | G10H 1/0025 381/103 |
| 2008/0111887 A1* | 5/2008 | Cooper | H04N 21/42203 704/E21.02 |
| 2009/0070674 A1* | 3/2009 | Johnston | G11B 27/34 715/716 |
| 2009/0087161 A1* | 4/2009 | Roberts | H04N 5/262 386/285 |
| 2009/0245603 A1* | 10/2009 | Koruga | A61B 5/444 382/128 |
| 2010/0077219 A1* | 3/2010 | Moskowitz | G06T 1/0028 713/176 |
| 2011/0261257 A1* | 10/2011 | Terry | H04N 21/234318 348/E9.034 |
| 2012/0321759 A1* | 12/2012 | Marinkovich | A61B 5/442 356/402 |
| 2015/0066820 A1* | 3/2015 | Kapur | G06N 20/00 706/12 |
| 2015/0124999 A1* | 5/2015 | Ren | H03G 3/00 381/98 |
| 2015/0205570 A1* | 7/2015 | Johnston | G06F 3/04842 715/727 |
| 2015/0220806 A1* | 8/2015 | Heller | G06F 16/5866 382/159 |
| 2015/0221321 A1 | 8/2015 | Christian | |
| 2015/0279383 A1* | 10/2015 | Crockett | G10L 19/0204 704/500 |
| 2015/0310870 A1* | 10/2015 | Vouin | G11B 27/28 704/500 |
| 2015/0310891 A1* | 10/2015 | Pello | G11B 20/10527 369/47.16 |
| 2015/0317945 A1* | 11/2015 | Andress | G06T 11/00 345/592 |
| 2015/0341572 A1* | 11/2015 | Kelder | H04N 5/2621 348/231.4 |
| 2015/0356992 A1* | 12/2015 | Wu | G11B 20/10259 386/207 |
| 2016/0065864 A1* | 3/2016 | Guissin | G06T 5/20 348/239 |
| 2016/0070962 A1* | 3/2016 | Shetty | G06F 16/7834 382/225 |
| 2016/0155066 A1* | 6/2016 | Drame | G06N 20/00 706/12 |
| 2016/0267179 A1* | 9/2016 | Mei | G06F 16/71 |
| 2017/0024615 A1* | 1/2017 | Allen | G06V 10/761 |
| 2017/0061625 A1* | 3/2017 | Estrada | G06N 3/04 |
| 2017/0076753 A1* | 3/2017 | Vouin | G11B 27/10 |
| 2017/0142809 A1* | 5/2017 | Paolini | H05B 45/20 |
| 2017/0148433 A1* | 5/2017 | Catanzaro | G06N 3/044 |
| 2017/0148468 A1* | 5/2017 | Kim | G10H 1/40 |
| 2017/0178661 A1* | 6/2017 | Cahill | G10L 21/028 |
| 2017/0200315 A1* | 7/2017 | Lockhart | H04N 13/344 |
| 2017/0208245 A1* | 7/2017 | Castillo | H04N 1/2104 |
| 2017/0244938 A1* | 8/2017 | Al Mohizea | H04N 23/65 |
| 2017/0278289 A1* | 9/2017 | Marino | G06T 7/536 |
| 2017/0303043 A1* | 10/2017 | Young | H04N 23/633 |
| 2017/0337693 A1* | 11/2017 | Baruch | G06T 7/12 |
| 2018/0011688 A1* | 1/2018 | Wei | G06F 3/0233 |
| 2018/0205922 A1* | 7/2018 | Wu | G11B 27/28 |
| 2018/0238943 A1* | 8/2018 | Bernsee | G06F 17/141 |
| 2018/0343477 A1* | 11/2018 | Loheide | H04N 21/233 |
| 2019/0020963 A1* | 1/2019 | Mor | H04S 7/307 |
| 2019/0034976 A1* | 1/2019 | Hamedi | G06Q 30/0243 |
| 2019/0035431 A1* | 1/2019 | Attorre | G10L 25/30 |
| 2019/0109804 A1* | 4/2019 | Fu | A63F 13/215 |
| 2019/0180446 A1* | 6/2019 | Medoff | G06F 18/23213 |
| 2019/0197362 A1* | 6/2019 | Campanella | G06V 10/30 |
| 2019/0285673 A1* | 9/2019 | Skovenborg | G10L 25/18 |
| 2019/0304076 A1* | 10/2019 | Nina Paravecino | G06T 7/11 |
| 2020/0051544 A1* | 2/2020 | Laput | G10L 25/51 |
| 2020/0293783 A1* | 9/2020 | Ramaswamy | G06F 18/256 |
| 2021/0012769 A1* | 1/2021 | Vasconcelos | G10L 15/02 |

FOREIGN PATENT DOCUMENTS

| | | |
|---|---|---|
| CN | 108769535 A | 11/2018 |
| CN | 109120983 A | 1/2019 |
| CN | 109309845 A | 2/2019 |
| JP | 2013-102333 A | 5/2013 |

OTHER PUBLICATIONS

"Douyin Kuaishou music video, how to do the effect of cover CD rotation?"; https://jingyan.baidu.com/article/3065b3b6501262becef8a461.html; Baidu; Apr. 2019; accessed Apr. 2022; 3 pages.

"Introductory AE: Visual music is not very familiar with this picture, it turns out that beginners can also do it, with tutorials"; https://www.bilibili.com/read/cv2891235?share_medium=iphone&share_plat=ios&share_source=COPY&share_tag=s_i&timestamp=1605776040 . . . ; Bilibili; Jun. 2019; accessed Apr. 2022; 5 pages.

* cited by examiner

VIDEO FILE GENERATING METHOD AND DEVICE, TERMINAL, AND STORAGE MEDIUM

CROSS-REFERENCE TO RELATED APPLICATION

The present application is the national phase of International Application No. PCT/CN2020/116576, titled "VIDEO FILE GENERATING METHOD AND DEVICE, TERMINAL, AND STORAGE MEDIUM", filed on Sep. 21, 2020, which claims priority to Chinese Patent Application No. 201910974857.6, titled "VIDEO FILE GENERATING METHOD AND DEVICE, TERMINAL, AND STORAGE MEDIUM", filed on Oct. 14, 2019, both of which are incorporated herein by reference in their entireties.

FIELD

The embodiments of the present disclosure relate to the field of image processing, and in particular to a method and an apparatus for generating a video file, a terminal, and a storage medium.

BACKGROUND

With the development of science and technology, music data can not only be heard, but also be "seen". Music visualization technology has been widely used in music playback scenes. In related technologies, the visualization of music waveforms is realized based on the spectral characteristics of the music data. However, this technology only considers the audio data itself and ignores other additional factors, resulting in a single visualization effect that cannot meet the diverse requirements of users.

SUMMARY

This summary is provided to introduce the idea in a simplified form. The idea will be described in detail in the following description. This summary is neither intended to identify key features or essential features of the claimed technical solution, nor intended to be used to limit the scope of the claimed technical solution.

In a first aspect, a method for generating a video file is provided according to an embodiment of the present disclosure. The method includes:
  presenting, in response to a received video editing instruction, a video editing interface, where the video editing interface includes at least one of an image selection button and an audio selection button;
  determining, in response to a clicking operation on a button in the video editing interface, a target audio and a target image for video synthesis;
  obtaining, for each of audio frames of the target audio, an audio parameter corresponding to the audio frame;
  generating, for each of the audio frames, a spectrogram corresponding to the audio frame based on the obtained audio parameter;
  generating, based on the generated spectrogram and the target image, multiple video frame images, where each of the multiple video frame images corresponds to one of the audio frames and includes the spectrum corresponding to the one of the audio frames; and
  performing, based on the multiple video frame images and the target audio, video encoding to obtain a target video file.

In the above solution, the generating, for each of the audio frames, a spectrogram corresponding to the audio frame based on the obtained audio parameter includes:
  sampling the target audio based on a preset sampling frequency to obtain an audio parameter corresponding to each of audio frames after sampling; and
  generating, for each of the audio frames after sampling, a spectrogram corresponding to the audio frame after sampling by performing Fourier transform on the audio parameter corresponding to the audio frame after sampling.

In the above solution, the generating, for each of the audio frames after sampling, a spectrogram corresponding to the audio frame after sampling based on the obtained audio parameter includes:
  determining, for each of the audio frames, an amplitude of the audio frame based on the obtained audio parameter;
  determining, for each of the audio frames, a spectrum envelop corresponding to the spectrogram based on the amplitude of the audio frame, to obtain multiple spectrum envelopes; and
  for each of the multiple spectrum envelopes, combining the spectrum envelope with the spectrum corresponding to the spectrum envelop, to obtain multiple combined spectrograms.

In the above solution, the generating, based on the generated spectrogram and the target image, multiple video frame images, where each of the multiple video frame images corresponds to one of the audio frames and includes the spectrum corresponding to the one of the audio frames includes:
  blurring the target image to obtain a blurred target image;
  obtaining a target region of the target image to obtain a target region image;
  combining the target region image with the spectrogram of each of the audio frames to obtain multiple combined images; and
  using each of the multiple combined images as a foreground and the blurred target image as a background to generate multiple video frame images each including the spectrogram.

In the above solution, the obtaining a target region of the target image to obtain a target region image includes:
  determining a region that is in the target image and that corresponds to a target object in the target image; and
  obtaining, based on the determined region, a region that includes the target object and that has a target shape, as the target region image.

In the above solution, before the combining the target region image with the spectrogram, the method further includes:
  performing color feature extraction on the blurred target image to obtain color features of respective pixels of the blurred target image;
  performing a weighted average on the color features of the respective pixels to determine a color of the blurred target image; and
  setting the determined color of the blurred image as a color of the spectrogram.

In the above solution, the spectrogram is a spectral histogram, and the combining the target region image with the spectrogram of each of the audio frames to obtain multiple combined images includes:
  arranging the spectral histogram around the target region image to form the multiple combined images, where a height of a spectral column in the spectral histogram represents an amplitude of a corresponding one of the audio frames, and an angle of the spectral column in the in the spectral histogram relative to an edge of the target region image represents a frequency of the corresponding audio frame.

In the above solution, the using each of the multiple combined images as a foreground and the blurred target image as a background to generate multiple video frame images each including the spectrogram includes:

obtaining a relative positional relationship between the foreground and the background in one of the multiple video frame images corresponding to an adjacent audio frame of the target audio frame; and generating, based on the obtained relative positional relationship, a video frame image corresponding to the target audio frame, where a presentation position of the foreground in the video frame image corresponding to the target audio frame is rotated by a present angle relative to a representation position of the foreground in the video frame image corresponding to the adjacent audio frame.

In a second aspect, an apparatus for generating a video file is provided according to an embodiment of the present disclosure. The apparatus includes:

a presentation unit configured to present, in response to a received video editing instruction, a video editing interface, where the video editing interface includes at least one of an image selection button and an audio selection button;

a determination unit configured to determine, in response to a clicking operation on a button in the video editing interface, a target audio and a target image for video synthesis;

an obtaining unit configured to obtain, for each of audio frames of the target audio, an audio parameter corresponding to the audio frame;

a first generation unit configured to generate, for each of the audio frames, a spectrogram corresponding to the audio frame based on the obtained audio parameter;

a second generation unit configured to generate, based on the generated spectrogram and the target image, multiple video frame images, where each of the multiple video frame images corresponds to one of the audio frames and includes the spectrum corresponding to the one of the audio frames; and an encoding unit configured to perform, based on the multiple video frame images and the target audio, video encoding to obtain a target video file.

In the above solution, the first generation unit is further configured to: sample the target audio based on a preset sampling frequency to obtain an audio parameter corresponding to each of audio frames after sampling; and generate, for each of the audio frames after sampling, a spectrogram corresponding to the audio frame after sampling by performing Fourier transform on the audio parameter corresponding to the audio frame after sampling.

In the above solution, the first generation unit is further configured to: determine, for each of the audio frames, an amplitude of the audio frame based on the obtained audio parameter;

determine, for each of the audio frames, a spectrum envelop corresponding to the spectrogram based on the amplitude of the audio frame, to obtain multiple spectrum envelopes; and for each of the multiple spectrum envelopes, combine the spectrum envelope with the spectrum corresponding to the spectrum envelop, to obtain multiple combined spectrograms.

In the above solution, the second generation unit is further configured to: blur the target image to obtain a blurred target image;

obtain a target region of the target image to obtain a target region image;

combine the target region image with the spectrogram of each of the audio frames to obtain multiple combined images; and use each of the multiple combined images as a foreground and the blurred target image as a background to generate multiple video frame images each including the spectrogram.

In the above solution, the second generation unit is further configured to: determine a region that is in the target image and that corresponds to a target object in the target image; and obtain, based on the determined region, a region that includes the target object and that has a target shape, as the target region image.

In the above solution, the apparatus further includes a color processing unit configured to, before the target region image is combined with the spectrogram:

perform color feature extraction on the blurred target image to obtain color features of respective pixels of the blurred target image;

perform a weighted average on the color features of the respective pixels to determine a color of the blurred target image; and set the determined color of the blurred image as a color of the spectrogram.

In the above solution, the second generation unit is further configured to: arrange the spectral histogram around the target region image to form the combined images, where a height of a spectral column in the spectral histogram represents an amplitude of a corresponding one of the audio frames, and an angle of the spectral column in the in the spectral histogram relative to an edge of the target region image represents a frequency of the corresponding audio frame.

In the above solution, the second generation unit is further configured to: obtain a relative positional relationship between the foreground and the background in one of the multiple video frame images corresponding to an adjacent audio frame of the target audio frame; and generate, based on the obtained relative positional relationship, a video frame image corresponding to the target audio frame, where a presentation position of the foreground in the video frame image corresponding to the target audio frame is rotated by a present angle relative to a representation position of the foreground in the video frame image corresponding to the adjacent audio frame.

In a third aspect, a terminal is provided according to an embodiment of the present disclosure. The terminal includes:

a memory configured to store executable instructions; and a processor configured to implement the method for generating a video file according to the embodiments of the present disclosure when executing the executable instructions.

In a fourth aspect, a non-transitory storage medium storing executable instructions is provided according to an embodiment of the present disclosure. The executable instructions are configured to perform, when executed, the method for generating a video file according to the embodiments of the present disclosure.

The embodiments of the present disclosure have the following beneficial effects.

The spectrogram of each of the audio frames of the target audio is combined with the target image, to generate multiple video frame images, where each of the multiple video frame images corresponds to one of the audio frames and includes the target image and the spectrum corresponding to the one of the audio frames, and the generated multiple video frame images and the target audio are encoded, to obtain the target video file for playback, so that the target video file, when played, presents a visualization effect that audio data is associated with the target image, thereby satisfying the diverse requirements of users.

BRIEF DESCRIPTION OF THE DRAWINGS

The above and other features, advantages and aspects of various embodiments of the present disclosure will become more apparent when taken in conjunction with the accompanying drawings and with reference to the following detailed description. Throughout the drawings, the same or similar reference numbers refer to the same or similar elements. It should be understood that the drawings are schematic and that the components and elements are not necessarily drawn to scale.

The above and other features, advantages and aspects of various embodiments of the present disclosure will become more apparent when taken in conjunction with the accompanying drawings and with reference to the following detailed description. Throughout the drawings, the same or similar reference numbers refer to the same or similar elements. It should be understood that the drawings are schematic and that the components and elements are not necessarily drawn to scale.

DESCRIPTION OF EMBODIMENTS

Figure 1:
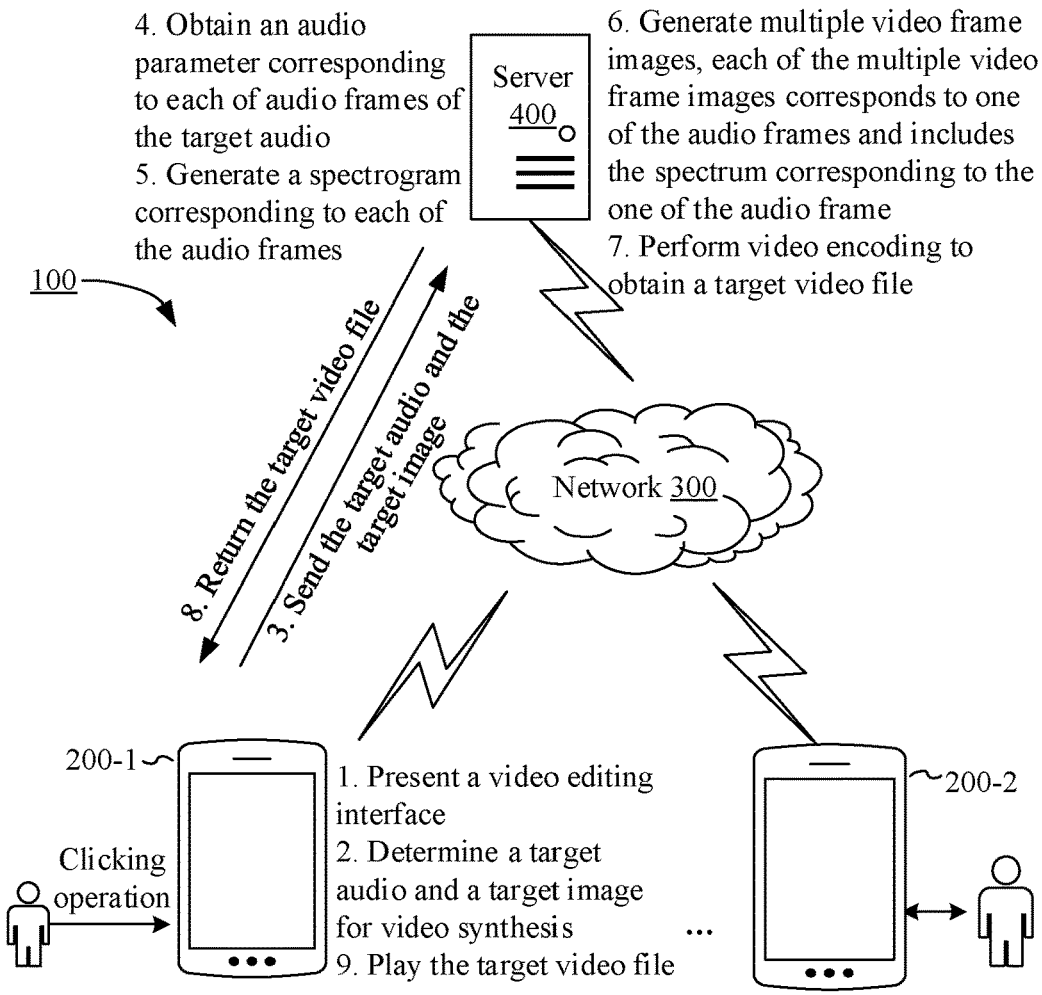
FIG. 1 is a schematic diagram showing architecture of a system for generating a video file according to an embodiment of the present disclosure.

Embodiments of the present disclosure will be described in more detail below with reference to the accompanying drawings. While certain embodiments of the present disclosure are shown in the drawings, it should be understood that the present disclosure may be embodied in various forms and should not be construed as limited to the embodiments set forth herein. Instead, the embodiments are provided for the purpose of a more thorough and complete understanding of the present disclosure. It should be understood that the drawings and embodiments of the present disclosure are only for exemplary purposes, and are not intended to limit the scope of the present disclosure.

It should be understood that the various steps described in the method embodiments of the present disclosure may be performed in different orders and/or in parallel. Furthermore, method embodiments may include additional steps and/or omit performing the illustrated steps. The scope of the present disclosure is not limited in this regard.

As used herein, the term "including" and variations thereof are open-ended inclusions, that is, "including but not limited to". The term "based on" means "based at least in part on." The term "one embodiment" means "at least one embodiment"; the term "another embodiment" means "at least one additional embodiment"; the term "some embodiments" means "at least some embodiments". Relevant definitions of other terms will be given in the description below.

It should be noted that concepts such as "first" and "second" mentioned in the present disclosure are only used to distinguish different devices, modules or units, and are not used to limit the order or interdependence of functions performed by these devices, modules or units.

It should be noted that the modifications of "a" and "a plurality" mentioned in the present disclosure are illustrative rather than restrictive, and those skilled in the art should understand that unless the context clearly indicates otherwise, they should be understood as "one or multiple".

The names of messages or information exchanged between multiple devices in the embodiments of the present disclosure are only for illustrative purposes, and are not intended to limit the scope of these messages or information.

Exemplary applications of the apparatus implementing the embodiments of the present disclosure are described below. The apparatus according to the embodiments of the present disclosure may be implemented as various types of user terminals such as a smart phone, a tablet computer, and a notebook computer, and may alternatively be implemented by a terminal in cooperation with a server. In the following, exemplary applications of the apparatus will be explained.

In some embodiments, a terminal alone performs operation. The terminal is configured to present, in response to a received video editing instruction, a video editing interface, where the video editing interface includes at least one of an image selection button and an audio selection button; determine, in response to a clicking operation on a button in the video editing interface, a target audio and a target image for video synthesis; obtain, for each of audio frames of the target audio, an audio parameter corresponding to the audio frame; generate, for each of the audio frames, a spectrogram corresponding to the audio frame based on the obtained audio parameter; generate, based on the generated spectrogram and the target image, multiple video frame images, where each of the multiple video frame images corresponds to one of the audio frames and includes the spectrum corresponding to the one of the audio frames; and perform, based on the multiple video frame images and the target audio, video encoding to obtain a target video file. In this way, obtaining of the audio parameter, generation of the spectrogram, generation of the video frame image including the spectrogram, and generation of the target video file are performed in real time on the terminal side, improving the efficiency of obtaining the target video file, thereby improving user experience.

In some embodiments, the terminal and the server cooperate with each other. Referring to FIG. 1, which is a schematic diagram showing architecture of a system 100 for generating a video file according to an embodiment of the present disclosure. In order to support an exemplary application, a terminal 200 (including a terminal 200-1 and a terminal 200-2), and a terminal 400 are connected to a server 400 through a network 300. The network 300 may be a wide area network or a local area network, or a combination of the two, which uses a wireless link to implement data transmission.

The terminal 200 is configured to present, in response to a received video editing instruction, a video editing interface, where the video editing interface includes at least one of an image selection button and an audio selection button; determine, in response to a clicking operation on a button in the video editing interface, a target audio and a target image for video synthesis; and send the determined target audio and the target image to the server 400.

The server 400 is configured to obtain, for each of audio frames of the target audio, an audio parameter corresponding to the audio frame; generate, for each of the audio frames, a spectrogram corresponding to the audio frame based on the obtained audio parameter; generate, based on the generated spectrogram and the target image, multiple video frame 30) images, where each of the multiple video frame images corresponds to one of the audio frames and includes the spectrum corresponding to the one of the audio frames; perform, based on the multiple video frame images and the target audio, video encoding to obtain a target video file; and send the obtained target video file to the terminal 200, to cause the terminal 200 to play the received target video file. In this way, obtaining of the audio parameter, generation of the spectrogram, generation of the video frame image including the spectrogram, and generation of the target video file are performed by the server, reducing the data processing load on the terminal side, which is suitable for the case that the amount of the target audio and the target image is great.

Figure 2:
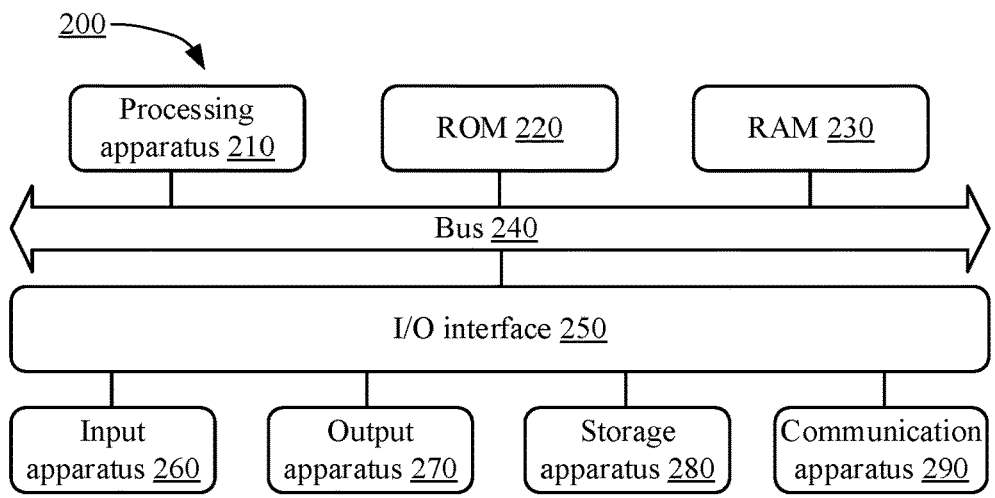
FIG. 2 is a schematic structural diagram of a terminal according to an embodiment of the present disclosure.

Reference is made to FIG. 2, which is a schematic structural diagram of a terminal 200 according to an embodiment of the present disclosure. The terminal may include a mobile terminal such as a mobile phone, a laptop computer, a digital broadcast receiver, a personal digital assistant (PDA), a tablet (PAD), a portable multimedia player (PMP), a vehicle-mounted terminal (such as an in-vehicle navigation terminal), and the like, and a fixed terminal such as a digital TV, a desktop computer, and the like. The terminal shown in FIG. 2 is only exemplary, and should not indicate any limitation to the function and scope of application of the embodiments of the present disclosure.

As shown in FIG. 2, the terminal 200 may include a processing apparatus 210, such as a central processing unit or a graphics processor, which can execute various appropriate actions and processes based on a program stored in a Read Only Memory (ROM) 220 or a program loaded from a storage apparatus 280 into a Random Access Memory (RAM) 230. In the RAM 230, various programs and data required by the terminal for operation are further stored. The processing apparatus 210, the ROM 220, and the RAM 230 are connected to each other through a bus 240. An input/output (I/O) interface 250 is also connected to the bus 240.

Generally, the following may be connected to the I/O interface 250: an input apparatus 260 such as a touch screen, a touch pad, a keyboard, a mouse, a camera, a microphone, an accelerometer, a gyroscope, an output apparatus 270 such as a Liquid Crystal Display (LCD), a speaker, a vibrator, a storage apparatus 280 such as a magnetic tape, a hard disk, and a communication apparatus 290. Based on the communication apparatus 290, the terminal may communicate with other devices through wired or wireless communication to exchange data. Although FIG. 2 shows the terminal including various apparatuses, it should be understood that not all shown apparatuses are required to be implemented or included. The shown apparatuses may be replaced by other apparatuses, or more or less apparatuses may be included.

Specifically, the processes described with reference to flow charts, may be implemented as a computer software program according to an embodiment of the present disclosure. For example, a computer program product is provided according to an embodiment of the present disclosure, the computer program product includes a computer program embodied on a computer readable medium. The computer program includes program codes for performing the method shown in the flowchart. In such embodiments, the computer program may be downloaded and installed from the network through the communication apparatus 290, installed from the storage apparatus 280, or installed from the ROM 220. The computer program, when being executed by the processing apparatus 210, performs functions defined in the method for generating a video file according to the embodiments of the present disclosure.

It should be noted that the computer readable medium according to the embodiments of the present disclosure may be a computer readable signal medium or a computer readable storage medium or any combination of the two. The computer readable storage medium may include, for example, but not limited to, an electronic, magnetic, optical, electromagnetic, infrared, or semiconductor system, apparatus, or device, or any combination of the foregoing. More particularly, the computer readable storage medium may include, but not limited to, an electrical connection having one or more wires, a portable computer diskette, a hard disk, a RAM, a ROM, an Erasable Programmable Read Only Memory (EPROM), a flash memory, an optical fiber, a portable Compact Disk Read-Only Memory (CD-ROM), an optical storage device, a magnetic storage device, or any suitable combination of the foregoing.

In the present disclosure, the computer readable storage medium may be any tangible medium containing or storing a program, where the program may be used by an instruction execution system, apparatus or device or used in combination therewith. In the present disclosure, the computer readable signal medium may include a data signal transmitted in a baseband or transmitted as a part of a carrier wave. The data signal carries computer readable program codes. The transmitted data signal may has a variety of forms including, but not limited to, an electromagnetic signal, an optical signal, or any suitable combination of the above. The computer readable signal medium may also be any other computer readable medium except for the computer readable storage medium. The computer readable signal medium may send, transmit or transfer programs used by an instruction execution system, apparatus or device or used in combination therewith. The program codes included in the computer readable medium may be transferred through any proper medium including an electric wire, an optical cable, Radio Frequency (RF), and the like, or any suitable combination of the foregoing.

The computer readable medium may be included in the terminal 200. Alternatively, the computer readable medium may exist independently and not assembled in the terminal 200.

The computer readable medium may carry one or more programs. The terminal 200, when executing the one or more programs, performs the method for generating a video file according to the embodiments of the present disclosure.

The computer program codes for performing the operations according to the embodiments of the present disclosure may be written in at least one programming language or a combination of the at least one programming language. The programming language includes an object oriented programming language such as Java, Smalltalk, C++ and a conventional procedural programming language such as "C" programming language or a programming language similar to "C" programming language. The program codes may be completely executed on a user computer, partially executed on the user computer, executed as a standalone software package, partially executed on the user computer and partially executed on a remote computer, completely executed on the remote computer or a server. In the cases relating to the remote computer, the remote computer may be connected to the user computer via any kind of networks including Local Area Network (LAN) or Wide Area Network (WAN), or the remote computer may be connected to an external computer (for example, via Internet provided by an Internet service provider).

Units and/or modules involved in the embodiments of the present disclosure may be implemented by software or by hardware.

In terms of hardware, the units and/or modules of the terminal implementing the embodiments of the present disclosure may be implemented by one or more Application Specific Integrated Circuits (ASICs), DSPs, Programmable Logic Devices (PLDs), Complex Programmable Logic Devices (CPLDs), Field-Programmable Gate Arrays (FPGAs), or other electronic components, for implementing the method for generating a video file according to the embodiments of the present disclosure.

Figure 3:
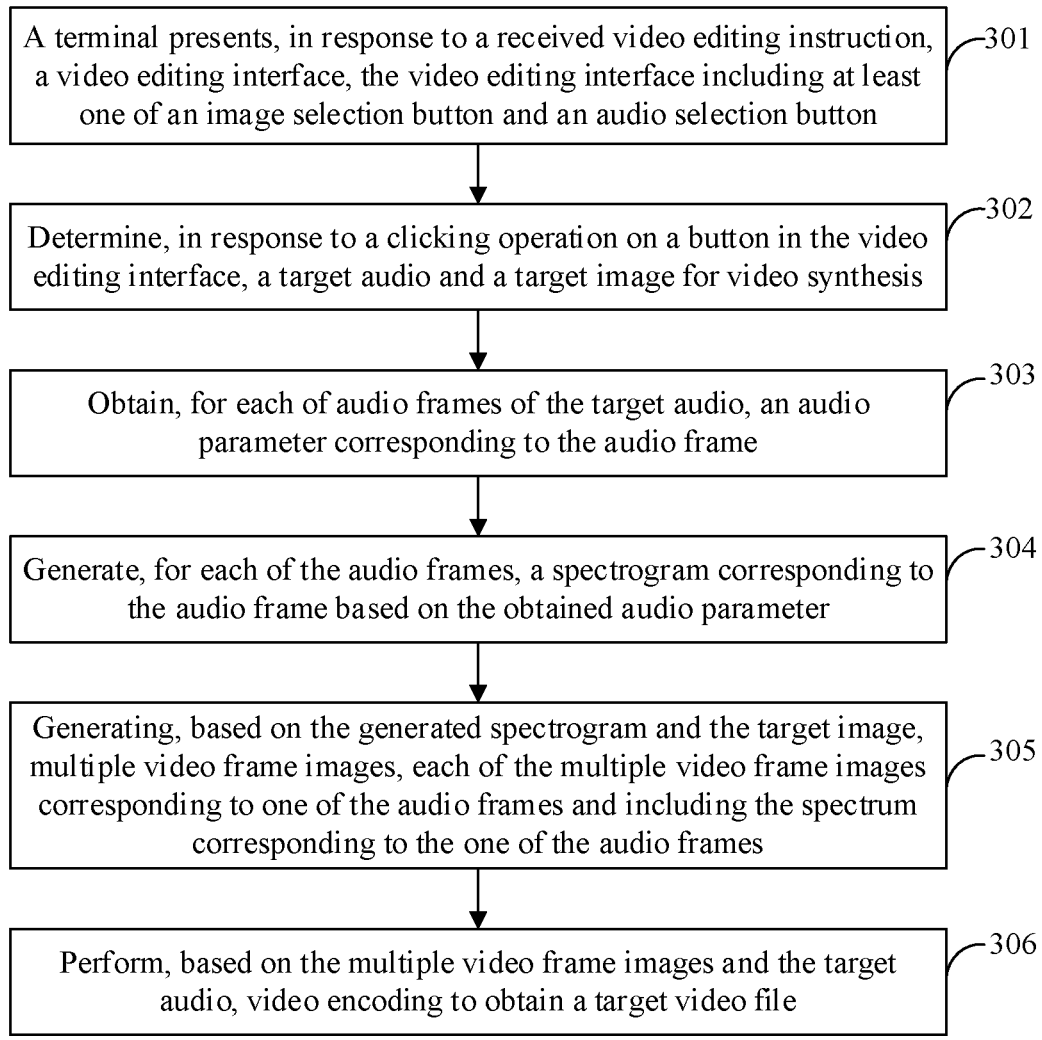
FIG. 3 is a flowchart of a method for generating a video file according to an embodiment of the present disclosure.

Referring to FIG. 3, FIG. 3 is a flowchart of a method for generating a video file according to an embodiment of the present disclosure. The method for generating a video file according to an embodiment of the present disclosure includes the following steps 301 to 306.

In step 301, in response to a received video editing instruction, a video editing interface is presented. The video editing interface includes at least one of an image selection button and an audio selection button.

In practice, the terminal is provided with a client, such as an instant messaging client, a microblog client, a short video client, and the like, and a user performs social interaction by loading a prop resource on the client, where the prop resource include at least one of: a video prop, an audio prop, a user interface (UI) animation prop. The video prop may include, for example, a video template, a video cover, and text associated with the video, such as a title, a video tag, and the like. The audio prop may be background music, and the UI animation may be an interface for network interaction.

In actual implementation, the user may click an editing button for a video on the client to trigger a corresponding editing instruction to the terminal. In response to the received editing instruction, the terminal presents the editing interface including the image selection button and/or the audio selection button.

Figure 4A:
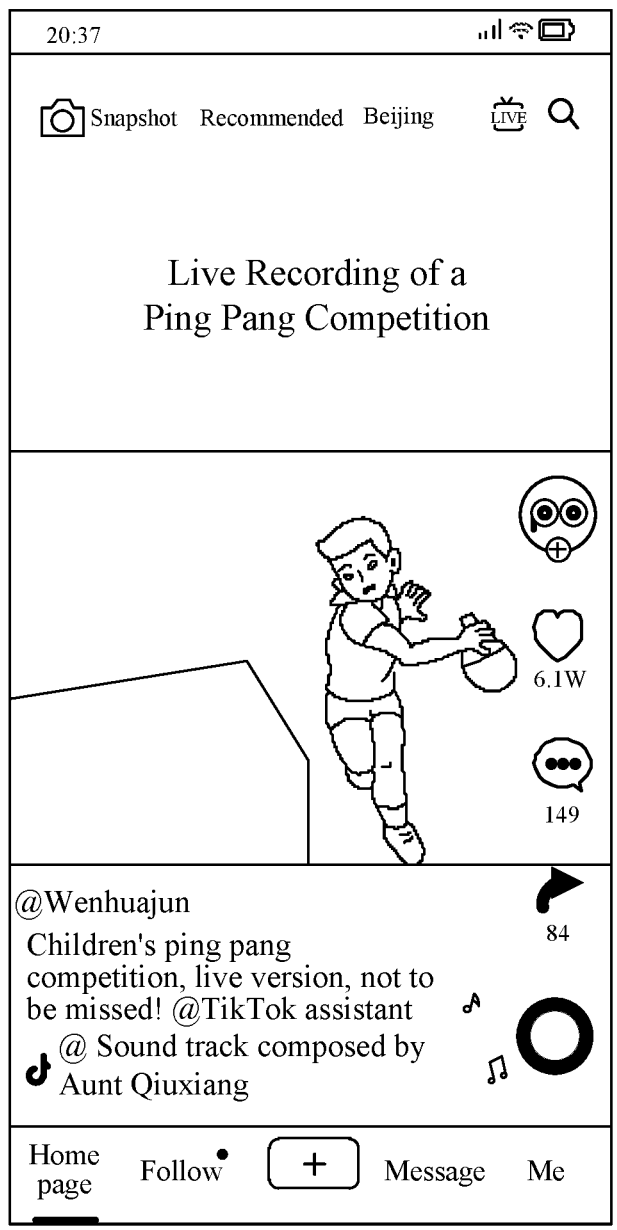
FIG. 4A is a schematic diagrams of an editing interface according to an embodiment of the present disclosure.
Figure 4B:
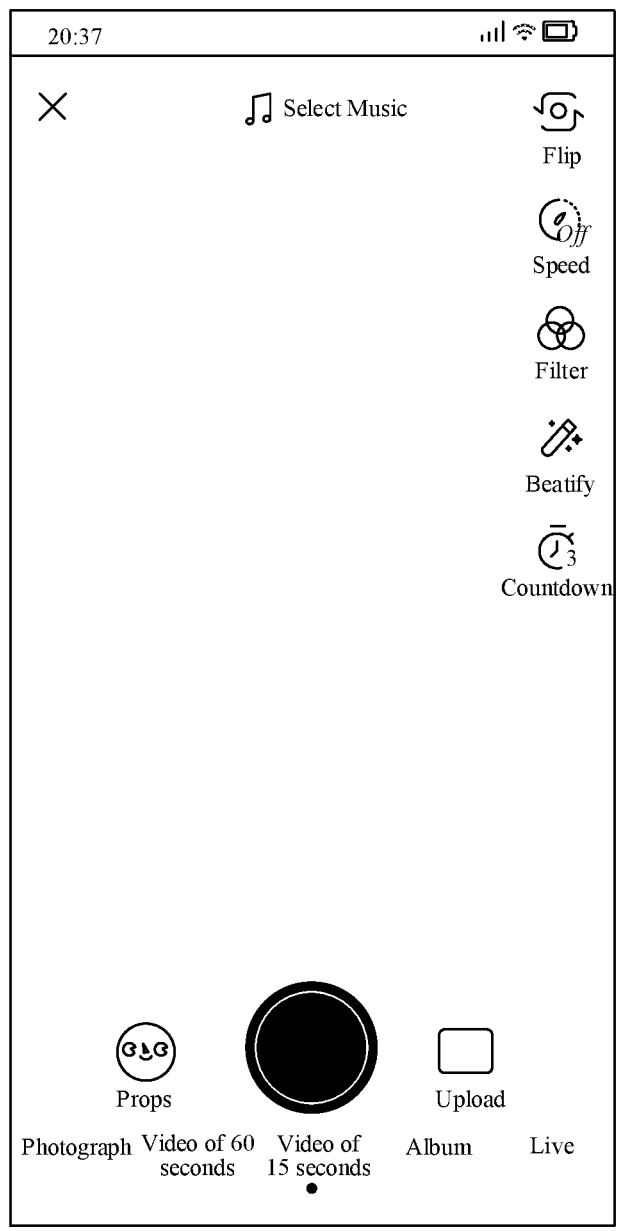
FIG. 4B is a schematic diagrams of an editing interface according to an embodiment of the present disclosure.
Figure 4C:
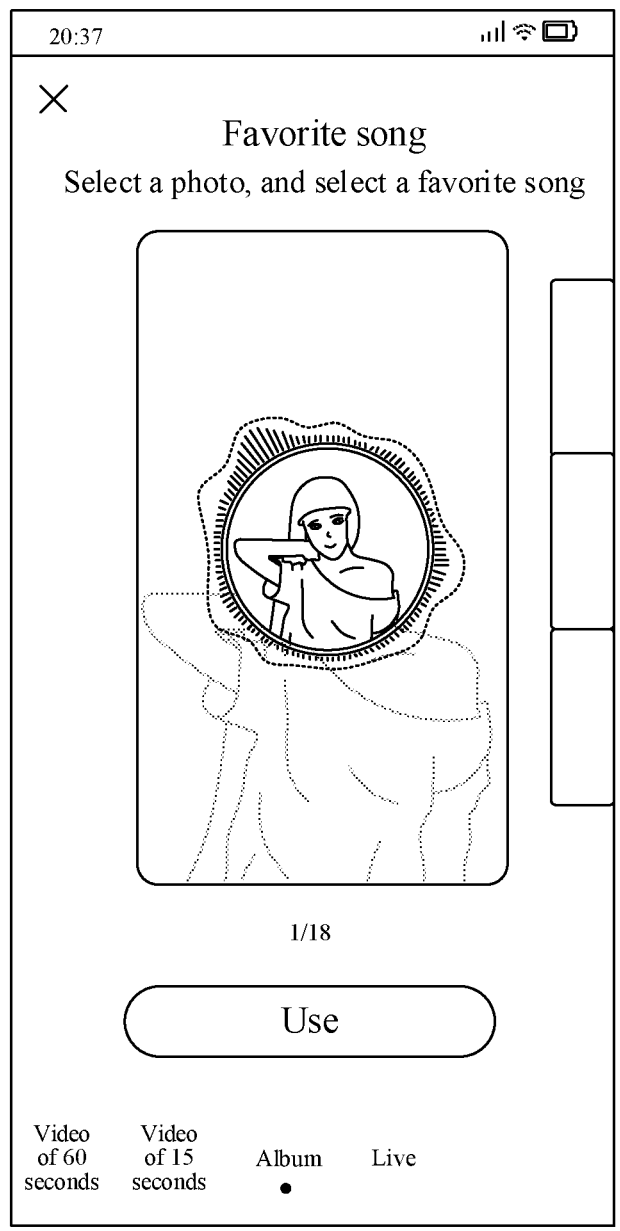
FIG. 4C is a schematic diagrams of an editing interface according to an embodiment of the present disclosure.
Figure 4D:
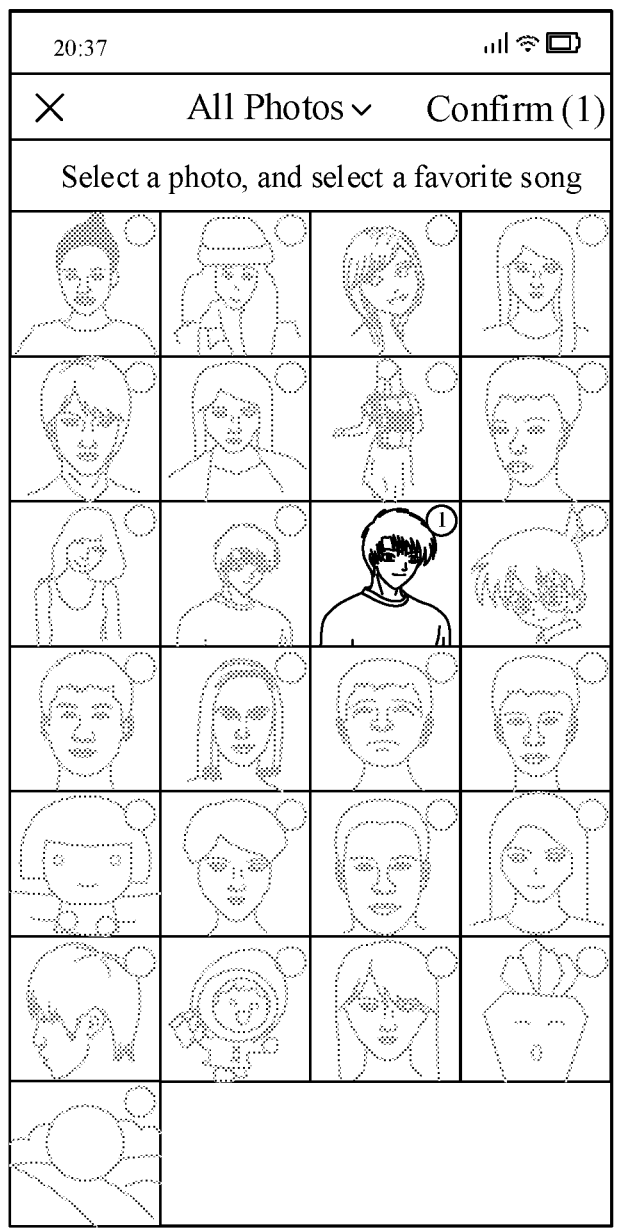
FIG. 4D is a schematic diagrams of an editing interface according to an embodiment of the present disclosure.

For example, referring to FIGS. 4A to 4D, which are schematic diagrams of editing interfaces according to an embodiment of the present disclosure. When a user opens a short video client provided on a terminal, an interface as shown in FIG. 4A is presented on the short video client. When the user clicks an editing button "+" in FIG. 4A, a default interface as shown in FIG. 4B is presented on the short video client. When the user clicks an "Album" button in FIG. 4B, a corresponding video editing instruction is triggered, and the short video client receives this editing instruction and presents video templates such as "Favorite Songs" and "Retro Magazine" as shown in FIG. 4C. When the user clicks a "use" button on the video template corresponding to "Favorite Songs" in FIG. 4C, a corresponding video editing interface including an image selection button and/or an audio selection button as shown in FIG. 4D is presented.

In step 302, in response to a click operation on the button included in the video editing interface, a target audio and a target image for video synthesis are determined.

In actual implementation, when the user clicks the button on the video editing interface, a corresponding operation instruction is triggered, and the terminal execute a corresponding operation on reception of the operation instruction. For example, when the user clicks a selection button for the target image as shown in FIG. 4D, the terminal receives a selection instruction triggered through the selection button for the target image, and obtains the target image for video synthesis. Similarly, the terminal may obtain the target audio in a same manner. In some embodiments, the target audio may alternatively be audio data carried by the video template.

In step 303, for each of audio frames of the target audio, an audio parameter corresponding to the audio frame is obtained.

In practice, the terminal obtains the audio data of the target audio. Here, the audio data indicates original data of the target audio that is not processed, such as sound information recorded in a voice recorder. The terminal performs, based on the obtained audio data of the target audio, calculation to obtain audio information parameters such as frequency information, accent information, volume information, and the like of the target audio.

In step 304, for each of the audio frames, a spectrogram corresponding to the audio frame is generated based on the obtained audio parameter.

In some embodiments, the terminal may generate spectrograms corresponding to the respective audio frames by:
sampling the target audio based on a preset sampling frequency to obtain an audio parameter corresponding to each of audio frames after sampling; and generating, for each of the audio frames after sampling, a spectrogram corresponding to the audio frame after sampling by performing Fourier transform on the audio parameter corresponding to the audio frame after sampling.

In actual implementation, music is generally sampled 44,100 times per second, to obtain 44,100 samples per second. Therefore, the target audio may be sampled at the preset sampling frequency to obtain audio parameters corresponding to multiple audio frames after sampling. In practice, the audio data is a chaotic waveform signal in the time domain. In order to facilitate analysis, the audio data in the time domain may be converted to the frequency domain through a fast Fourier transform to obtain a spectrogram of the audio data.

In some embodiments, the terminal may generate the spectrogram corresponding to each of the audio frames by:
determining, for each of the audio frames, an amplitude of the audio frame; determining, for each of the audio frames, a spectrum envelop corresponding to the spectrogram based on the amplitude of the audio frame, to obtain multiple spectrum envelopes; and for each of the multiple spectrum envelopes, combining the spectrum envelope with the spectrum corresponding to the spectrum envelop, to obtain multiple combined spectrograms.

Here, the target audio is sampled and Fourier transformed, and a frequency corresponding to each of the audio frames and amplitude information corresponding to the frequency may be determined. For each of the audio frames, a maximum amplitude corresponding to a current real-time frequency may be obtained, Gaussian attenuation is applied from the maximum amplitude point towards both sides to obtain the spectrum envelope of the spectrogram corresponding to the audio frame, and the obtained spectrum envelope is combined with the corresponding spectrogram to obtain a spectrogram containing the spectrum envelope.

In step 305, multiple video frame images are generated based on the generated spectrogram and the target image, where each of the multiple video frame images corresponds to one of the audio frames and includes the spectrum corresponding to the one of the audio frames.

In some embodiments, the terminal may generate the multiple video frame images that each corresponds to one of the audio frames and includes the spectrum corresponding to the one of the audio frames based on the generated spectrogram and the target image by:
  blurring the target image to obtain a blurred target image;
    obtaining a target region of the target image to obtain a target region image; combining the target region image with the spectrogram of each of the audio frames to obtain multiple combined images; and using each of the multiple combined images as a foreground and the blurred target image as a background to generate multiple video frame images each including the spectrogram.

In actual implementation, in order to reduce a noise of an image or reduce levels of detail of the image, blurring techniques such as Gaussian and filtering are generally used to blur the target image to obtain a blurred image, and the blurred image is used as the background of the video frame image. When constructing a video frame image, in some embodiments, the terminal obtains the region of the target image in the following manner to obtain the target region image:
  determining a region that is in the target image and that corresponds to a target object in the target image; and obtaining, based on the determined region, a region that includes the target object and that has a target shape, as the target region image.

Here, in practice, the terminal obtains the region of the target image according to a target object or specific location selected by the user in the target image. For example, when the target image is an image of a person, a location region in which the person object is located in the target image is determined as the region that is in the target image and that corresponds to the target object; when the target image is a landscape image, a location region in which a certain scenery is located in the target image is determined as the region that is in the target image and that corresponds to the target object.

Next, the terminal cuts the determined region in which the target object is located in the target image according to a target shape. For example, the region including the target object is cut according to a circular shape to obtain a circular target region image; or the region including the target object cut according to a star shape to obtain a star-shaped target region image. Of course, the terminal may alternatively cut the region including the target object according to another shape to obtain a target region image having another shape, where the shape is not limited in the present disclosure.

In practice, in order to better integrate the target image with the target audio, such that the visualization of the target audio can better show the characteristics of the target image, before the combining the target region image with the spectrogram of each of the audio frames, the terminal may determine a color of the spectrogram by:
  performing color feature extraction on the blurred target image to obtain color features of respective pixels of the blurred target image; performing a weighted average on the color features of the respective pixels to determine a color of the blurred target image; and setting the determined color of the blurred image as a color of the spectrogram.

In practice, the color feature of an image is determined based on features of image pixels, which describe a surface property of a scene corresponding to the image and an image region. Since the color is insensitive to changes in directions and sizes of the image or the image region, the color of the blurred target image may be used to represent the color of the target image.

In actual implementation, the terminal extracts the color of the blurred target image based on color feature extraction algorithms such as the color histogram method, the global cumulative histogram method, and the statistical feature method of color parameters to obtain the color features of the respective pixels in the blurred target image. The color features of the respective pixels are weighted and averaged to obtain the color of the blurred target image. The color of the blurred target image is mapped to the spectrograms of the target audio. In this way, the color of the spectrograms is changed in real time based on the content of the target image.

In some embodiments, the spectrogram may be presented in columns or ripples. In a case that the spectrogram is a spectral histogram, the terminal combines the target region image with the spectrogram of each of the audio frames to obtain multiple combined images by:
  arranging the spectral histogram around the target region image to form the multiple combined images, where a height of a spectral column in the spectral histogram represents an amplitude of a corresponding one of the audio frames, and an angle of the spectral column in the in the spectral histogram relative to an edge of the target region image represents a frequency of the corresponding audio frame.

In actual implementation, the terminal distributes the spectral histogram evenly around the target region image at a certain distribution angle according to the frequency of the audio frame of the target audio. The height of the corresponding spectral column in the spectral histogram is determined based on the amplitude of the corresponding audio frame. A greater amplitude of the audio frame of the target audio corresponds to a greater height of the corresponding spectral column in the spectral histogram, and a smaller amplitude of the audio frame of the target audio corresponding to a smaller height of the corresponding spectral column in the spectral histogram. In addition, in a case that the target region image has a circular shape, the spectral histogram is evenly distributed around the target region image in a circular shape. In a case that the target region image has a star shape, the spectral histogram is evenly distributed around the target region image in a star shape. In this way, the foreground of each of the multiple video frame images is obtained based on the target image and the spectrogram of each of the audio frames of the target audio.

In some embodiments, the terminal may generate the multiple video frame images each including the spectrogram by using the foreground by:

obtaining a relative positional relationship between the foreground and the background in one of the multiple video frame images corresponding to an adjacent audio frame of the target audio frame; and generating, based on the obtained relative positional relationship, a video frame image corresponding to the target audio frame, where a presentation position of the foreground in the video frame image corresponding to the target audio frame is rotated by a present angle relative to a representation position of the foreground in the video frame image corresponding to the adjacent audio frame.

Figure 5:
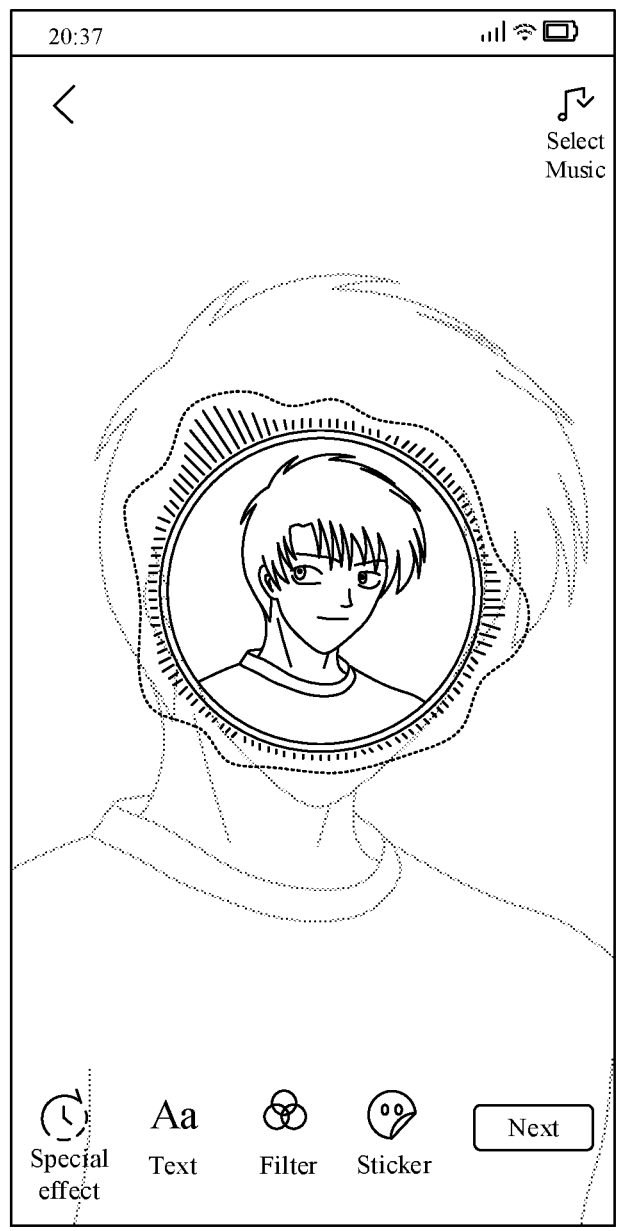
FIG. 5 is a schematic diagram of an interface displaying a video frame image according to an embodiment of the present disclosure.

Here, in practice, as the target audio is played, the corresponding spectrogram changes in real time. Correspondingly, the combined image including the spectrogram and the target region image also changes in real time. Therefore, the relative positional relationship between the foreground and the background presented by the video frame image corresponding to the adjacent audio frame of the target audio frame also changes in real time. The terminal may combine the foreground and the background based on the obtained relative positional relationship between the foreground and the background to generate the corresponding video frame image. Referring to FIG. 5, which 5 is a schematic diagram of an interface displaying a video frame image according to an embodiment of the present disclosure, the background of the video frame image is the blurred target image, and the foreground is the combined image including the spectrogram and the target region image. The foreground changes in real time with the playback of the target audio.

In step 306, video encoding is performed based on the multiple video frame images and target audio to obtain a target video file.

By blurring the target image, the blurred target image is obtained; the color of the blurred target image is mapped to the spectrograms of the target audio; the blurred target image is used as the background, and the combined image including the spectrogram and the target image is used as the foreground to generate multiple video frame images corresponding to the respective audio frames; and the multiple generated video frame images and the target audio are encoded to obtain the target video file for playback, so that the target video file, when played, presents a visualization effect that audio data is associated with the target image, thereby satisfying the diverse requirements of users.

Figure 6:
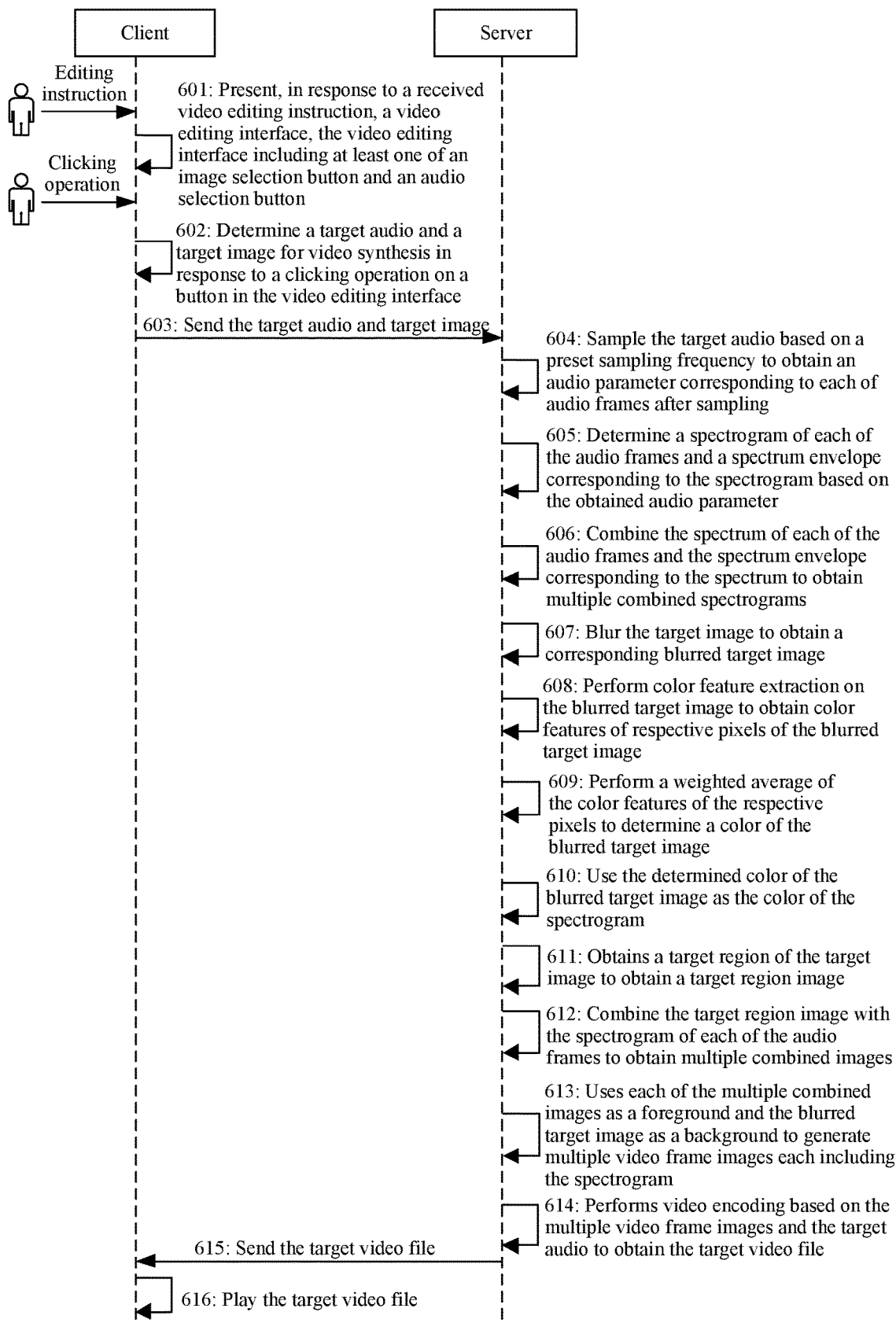
FIG. 6 is a flowchart of a method for generating a video file according to an embodiment of the present disclosure.

Referring to FIG. 6, which is a flowchart of a method for generating a video file according to an embodiment of the present disclosure. The method for generating a video file may be implemented by a client on a terminal in cooperation with a server. The method for generating a video file according to an embodiment of the present disclosure includes the following steps 601 to 616.

In step 601, the client presents, in response to a received video editing instruction, a video editing interface. The video editing interface includes at least one of an image selection button and an audio selection button.

In practice, the terminal is provided with a client, such as an instant messaging client, a microblog client, a short video client, and the like, and a user performs social interaction by loading a prop resource on the client. In actual implementation, the user may click an editing button for the video on the client to trigger a corresponding editing instruction to the terminal; and on reception of the editing instruction triggered by the user, the terminal correspondingly presents the video editing interface including an image selection button and/or an audio selection button.

In step 602, the client determines a target audio and a target image for video synthesis in response to a clicking operation on a button in the video editing interface.

In step 603, the client sends the target audio and target image to the server.

In step 604, the server samples the target audio based on a preset sampling frequency to obtain an audio parameter corresponding to each of audio frames after sampling.

In step 605, the server determines a spectrogram of each of the audio frames and a spectrum envelope corresponding to the spectrogram based on the obtained audio parameter.

Here, in actual implementation, the server converts the audio data in the time domain to the frequency domain through a fast Fourier transform to obtain a spectrogram including frequency and amplitude information of each of the audio frames. For each of the audio frames, a maximum amplitude corresponding to a current real-time frequency may be obtained, Gaussian attenuation is applied from the maximum amplitude point towards both sides to obtain the spectrum envelope of the spectrogram corresponding to the audio frame.

In step 606, the server combines the spectrum of each of the audio frames and the spectrum envelope corresponding to the spectrum to obtain multiple combined spectrograms.

In step 607, the server blurs target image to obtain a corresponding blurred target image.

In step 608, the server performs color feature extraction on the blurred target image to obtain color features of respective pixels of the blurred target image.

In step 609, the server performs a weighted average of the color features of the respective pixels to determine a color of the blurred target image.

In step 610, the server uses the determined color of the blurred target image as the color of the spectrogram.

Here, in practice, the color feature of an image is determined based on features of image pixels, which describe a surface property of a scene corresponding to the image and an image region. Since the color is insensitive to changes in directions and sizes of the image or the image region, the color of the blurred target image may be used to represent the color of the target image.

In step 611, the server obtains a target region of the target image to obtain a target region image.

Here, in practice, the terminal obtains the region of the target image according to a target object or specific location selected by the user in the target image. For example, when the target image is an image of a person, a location region in which the person object is located in the target image is determined as the region that is in the target image and that corresponds to the target object; when the target image is a landscape image, a location region in which a certain scenery is located in the target image is determined as the region that is in the target image and that corresponds to the target object.

In step 612, the server combines the target region image with the spectrogram of each of the audio frames to obtain multiple combined images.

In step 613, the server uses each of the multiple combined images as a foreground and the blurred target image as a background to generate multiple video frame images each including the spectrogram.

Here, the server may first obtain a relative positional relationship between the foreground and the background of the video frame image corresponding to an adjacent audio frame of the target audio frame, and generate, based on the obtained relative positional relationship, a video frame image corresponding to the target audio frame, where a presentation position of the foreground in the video frame image corresponding to the target audio frame is rotated by a present angle relative to a representation position of the foreground in the video frame image corresponding to the adjacent audio frame.

In step 614, the server performs video encoding based on the multiple video frame images and the target audio to obtain the target video file.

In step 615, the server sends the target video file to the client.

In step 616, the client plays the target video file.

Figure 7:
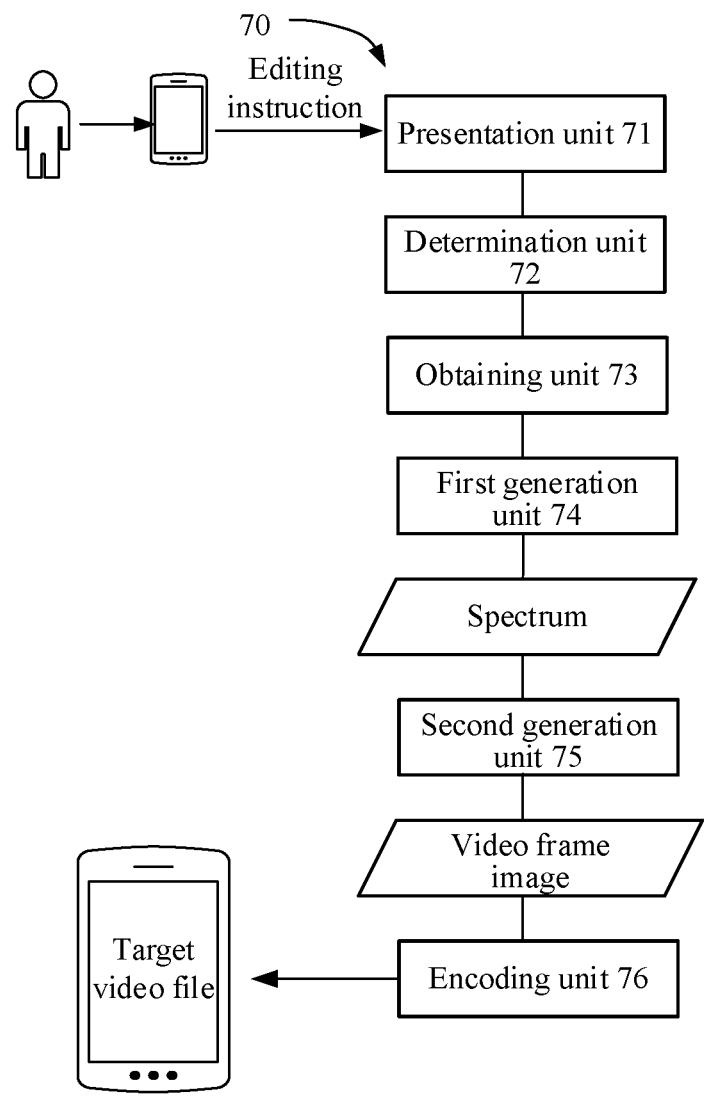
FIG. 7 is a schematic diagram showing a composition and a structure of an apparatus for generating a video file according to an embodiment of the present disclosure.

In the following, a software implementation of an apparatus for generating a video file according to an embodiment of the present disclosure is described. FIG. 7 is a schematic diagram of a composition and structure of an apparatus for generating a video file according to an embodiment of the present disclosure. As shown in FIG. 7, an apparatus 70 for generating a video file according to an embodiment of the present disclosure includes:

a presentation unit 71 configured to present, in response to a received video editing instruction, a video editing interface, where the video editing interface includes at least one of an image selection button and an audio selection button;

a determination unit 72 configured to determine, in response to a clicking operation on a button in the video editing interface, a target audio and a target image for video synthesis;

an obtaining unit 73 configured to obtain, for each of audio frames of the target audio, an audio parameter corresponding to the audio frame;

a first generation unit 74 configured to generate, for each of the audio frames, a spectrogram corresponding to the audio frame based on the obtained audio parameter;

a second generation unit 75 configured to generate, based on the generated spectrogram and the target image, multiple video frame images, where each of the multiple video frame images corresponds to one of the audio frames and includes the spectrum corresponding to the one of the audio frames; and an encoding unit 76 configured to perform, based on the multiple video frame images and the target audio, video encoding to obtain a target video file.

In some embodiments, the first generation unit is further configured to: sample the target audio based on a preset sampling frequency to obtain an audio parameter corresponding to each of audio frames after sampling; and generate, for each of the audio frames after sampling, a spectrogram corresponding to the audio frame after sampling by performing Fourier transform on the audio parameter corresponding to the audio frame after sampling.

In the above solution, the first generation unit is further configured to: determine, for each of the audio frames, an amplitude of the audio frame based on the obtained audio parameter;

determine, for each of the audio frames, a spectrum envelop corresponding to the spectrogram based on the amplitude of the audio frame, to obtain multiple spectrum envelopes; and for each of the multiple spectrum envelopes, combine the spectrum envelope with the spectrum corresponding to the spectrum envelop, to obtain multiple combined spectrograms.

In some embodiments, the second generation unit is further configured to: blur the target image to obtain a blurred target image;

obtain a target region of the target image to obtain a target region image;

combine the target region image with the spectrogram of each of the audio frames to obtain multiple combined images; and use each of the multiple combined images as a foreground and the blurred target image as a background to generate multiple video frame images each including the spectrogram.

In some embodiments, the second generation unit is further configured to: determine a region that is in the target image and that corresponds to a target object in the target image; and obtain, based on the determined region, a region that includes the target object and that has a target shape, as the target region image.

In some embodiments, the apparatus further includes a color processing unit configured to, before the target region image is combined with the spectrogram:

perform color feature extraction on the blurred target image to obtain color features of respective pixels of the blurred target image;

perform a weighted average on the color features of the respective pixels to determine a color of the blurred target image; and set the determined color of the blurred image as a color of the spectrogram.

In some embodiments, the second generation unit is further configured to arrange the spectral histogram around the target region image to form the combined images, where a height of a spectral column in the spectral histogram represents an amplitude of a corresponding one of the audio frames, and an angle of the spectral column in the in the spectral histogram relative to an edge of the target region image represents a frequency of the corresponding audio frame.

In some embodiments, the second generation unit is further configured to: obtain a relative positional relationship between the foreground and the background in one of the multiple video frame images corresponding to an adjacent audio frame of the target audio frame; and generate, based on the obtained relative positional relationship, a video frame image corresponding to the target audio frame, where a presentation position of the foreground in the video frame image corresponding to the target audio frame is rotated by a present angle relative to a representation position of the foreground in the video frame image corresponding to the adjacent audio frame.

A terminal is provided according to an embodiment of the present disclosure. The terminal includes a memory and a processor.

The memory is configured to store executable instructions.

The processor is configured to implement the method for generating a video file according to the embodiments of the present disclosure when executing the executable instructions.

A non-transitory storage medium storing executable instructions is provided according to an embodiment of the present disclosure. The executable instructions are configured to perform, when executed, the method for generating a video file according to the embodiments of the present disclosure.

According to one or more embodiments of the present disclosure, a method for generating a video file is provided according to an embodiment of the present disclosure. The method includes:
  presenting, in response to a received video editing instruction, a video editing interface, where the video editing interface includes at least one of an image selection button and an audio selection button;
  determining, in response to a clicking operation on a button in the video editing interface, a target audio and a target image for video synthesis;
  obtaining, for each of audio frames of the target audio, an audio parameter corresponding to the audio frame;
  generating, for each of the audio frames, a spectrogram corresponding to the audio frame based on the obtained audio parameter;
  generating, based on the generated spectrogram and the target image, multiple video frame images, where each of the multiple video frame images corresponds to one of the audio frames and includes the spectrum corresponding to the one of the audio frames; and
  performing, based on the multiple video frame images and the target audio, video encoding to obtain a target video file.

In some embodiments, the generating, for each of the audio frames, a spectrogram corresponding to the audio frame based on the obtained audio parameter includes:
  sampling the target audio based on a preset sampling frequency to obtain an audio parameter corresponding to each of audio frames after sampling; and
  generating, for each of the audio frames after sampling, a spectrogram corresponding to the audio frame after sampling by performing Fourier transform on the audio parameter corresponding to the audio frame after sampling.

In some embodiments, the generating, for each of the audio frames after sampling, a spectrogram corresponding to the audio frame after sampling based on the obtained audio parameter includes:
  determining, for each of the audio frames, an amplitude of the audio frame based on the obtained audio parameter;
  determining, for each of the audio frames, a spectrum envelop corresponding to the spectrogram based on the amplitude of the audio frame, to obtain multiple spectrum envelopes; and
  for each of the multiple spectrum envelopes, combining the spectrum envelope with the spectrum corresponding to the spectrum envelop, to obtain multiple combined spectrograms.

In some embodiments, the generating, based on the generated spectrogram and the target image, multiple video frame images, where each of the multiple video frame images corresponds to one of the audio frames and includes the spectrum corresponding to the one of the audio frames includes:
  blurring the target image to obtain a blurred target image;
  obtaining a target region of the target image to obtain a target region image;
  combining the target region image with the spectrogram of each of the audio frames to obtain multiple combined images; and
  using each of the multiple combined images as a foreground and the blurred target image as a background to generate multiple video frame images each including the spectrogram.

In some embodiments, the obtaining a target region of the target image to obtain a target region image includes:
  determining a region that is in the target image and that corresponds to a target object in the target image; and
  obtaining, based on the determined region, a region that includes the target object and that has a target shape, as the target region image.

In some embodiments, before the combining the target region image with the spectrogram, the method further includes:
  performing color feature extraction on the blurred target image to obtain color features of respective pixels of the blurred target image;
  performing a weighted average on the color features of the respective pixels to determine a color of the blurred target image; and
  setting the determined color of the blurred image as a color of the spectrogram.

In some embodiments, the spectrogram is a spectral histogram, and the combining the target region image with the spectrogram of each of the audio frames to obtain multiple combined images includes:
  arranging the spectral histogram around the target region image to form the multiple combined images, where
  a height of a spectral column in the spectral histogram represents an amplitude of a corresponding one of the audio frames, and an angle of the spectral column in the in the spectral histogram relative to an edge of the target region image represents a frequency of the corresponding audio frame.

In some embodiments, the using each of the multiple combined images as a foreground and the blurred target image as a background to generate multiple video frame images each including the spectrogram includes:
  obtaining a relative positional relationship between the foreground and the background in one of the multiple video frame images corresponding to an adjacent audio frame of the target audio frame; and
  generating, based on the obtained relative positional relationship, a video frame image corresponding to the target audio frame, where a presentation position of the foreground in the video frame image corresponding to the target audio frame is rotated by a present angle relative to a representation position of the foreground in the video frame image corresponding to the adjacent audio frame.

An apparatus for generating a video file is provided according to an embodiment of the present disclosure, the apparatus includes:
  a presentation unit configured to present, in response to a received video editing instruction, a video editing interface, where the video editing interface includes at least one of an image selection button and an audio selection button;
  a determination unit configured to determine, in response to a clicking operation on a button in the video editing interface, a target audio and a target image for video synthesis;
  an obtaining unit configured to obtain, for each of audio frames of the target audio, an audio parameter corresponding to the audio frame;

a first generation unit configured to generate, for each of the audio frames, a spectrogram corresponding to the audio frame based on the obtained audio parameter;

a second generation unit configured to generate, based on the generated spectrogram and the target image, multiple video frame images, where each of the multiple video frame images corresponds to one of the audio frames and includes the spectrum corresponding to the one of the audio frames; and an encoding unit configured to perform, based on the multiple video frame images and the target audio, video encoding to obtain a target video file.

The above are only preferred embodiments of the present disclosure and are illustrative of the technical principles applied in the present disclosure. It should be understood by those skilled in the art that the scope of the present disclosure is not limited to the above technical solutions formed by a specific combination of technical features, and also encompasses other technical solutions formed by any combination of the above technical features or equivalent features thereof, without departing from the inventive concept of the present disclosure, for example, technical solutions formed by replacing the above features and the technical features disclosed in present disclosure (but not limited to) with similar functions.

In addition, although the operations are depicted in a specific order, it should not be understood as these operations are required to be performed in the specific order shown or performed in a sequential order. Under certain circumstances, multitasking and parallel processing may be advantageous. Likewise, although several specific implementation details are included in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable sub-combination.

Although the subject matter has been described in language specific to structural features and/or method logical actions, it should be understood that the subject matter defined in the appended claims is not necessarily limited to the specific features or actions described above. On the contrary, the specific features and actions described above are merely exemplary forms of implementing the claims.

The invention claimed is:

1. A method for generating a video file, comprising:
presenting, in response to a received video editing instruction, a video editing interface, wherein the video editing interface is configured to enable a selection of an image and a selection of an audio;
determining a target audio and a target image in response to receiving input via the video editing interface;
obtaining, for each of audio frames of the target audio, an audio parameter corresponding to the audio frame;
generating, for each of the audio frames, a spectrogram corresponding to the audio frame based on the obtained audio parameter;
generating, based on the generated spectrogram and the target image, a plurality of video frame images, wherein each of the plurality of video frame images corresponds to one of the audio frames, and each of the plurality of video frame images comprises an image of the spectrum corresponding to the one of the audio frames; and
performing, based on the plurality of video frame images and the target audio, video encoding to generate a target video file.

2. The method according to claim 1, wherein the generating, for each of the audio frames, a spectrogram corresponding to the audio frame based on the obtained audio parameter comprises:
sampling the target audio based on a preset sampling frequency to obtain an audio parameter corresponding to each of audio frames after sampling; and
generating, for each of the audio frames after sampling, a spectrogram corresponding to the audio frame after sampling by performing Fourier transform on the audio parameter corresponding to the audio frame after sampling.

3. The method according to claim 2, wherein the generating, for each of the audio frames after sampling, a spectrogram corresponding to the audio frame after sampling comprises:
determining, for each of the audio frames, an amplitude of the audio frame;
determining, for each of the audio frames, a spectrum envelop corresponding to the spectrogram based on the amplitude of the audio frame, to obtain a plurality of spectrum envelopes; and
for each of the plurality of spectrum envelopes, combining the spectrum envelope with the spectrum corresponding to the spectrum envelop, to obtain a plurality of combined spectrograms.

4. The method according to claim 1, wherein the generating, based on the generated spectrogram and the target image, a plurality of video frame images, wherein each of the plurality of video frame images corresponds to one of the audio frames and comprises the spectrum corresponding to the one of the audio frames comprises:
blurring the target image to obtain a blurred target image;
obtaining a target region of the target image to obtain a target region image;
combining the target region image with the spectrogram of each of the audio frames to obtain a plurality of combined images; and
using each of the plurality of combined images as a foreground and the blurred target image as a background to generate a plurality of video frame images each comprising the spectrogram.

5. The method according to claim 4, wherein the obtaining a target region of the target image to obtain a target region image comprises:
determining a region that is in the target image and that corresponds to a target object in the target image; and
obtaining, based on the determined region, a region that comprises the target object and that has a target shape, as the target region image.

6. The method according to claim 4, wherein before the combining the target region image with the spectrogram of each of the audio frames, the method further comprises:
performing color feature extraction on the blurred target image to obtain color features of respective pixels of the blurred target image;
performing a weighted average on the color features of the respective pixels to determine a color of the blurred target image; and
setting the determined color of the blurred image as a color of the spectrogram.

7. The method according to claim 4, wherein the spectrogram is a spectral histogram, and the combining the target region image with the spectrogram of each of the audio frames to obtain a plurality of combined images comprises:
arranging the spectral histogram around the target region image to form the plurality of combined images, wherein a height of a spectral column in the spectral histogram represents an amplitude of a corresponding one of the audio frames, and an angle of the spectral column in the spectral histogram relative to an edge of the target region image represents a frequency of the corresponding audio frame.

8. The method according to claim 4, wherein the using each of the plurality of combined images as a foreground and the blurred target image as a background to generate a plurality of video frame images each comprising the spectrogram comprises:
obtaining a relative positional relationship between the foreground and the background in one of the plurality of video frame images corresponding to an adjacent audio frame of the target audio frame; and
generating, based on the obtained relative positional relationship, a video frame image corresponding to the target audio frame, where a presentation position of the foreground in the video frame image corresponding to the target audio frame is rotated by a present angle relative to a representation position of the foreground in the video frame image corresponding to the adjacent audio frame.

9. An apparatus for generating a video file, comprising:
at least one processor; and
at least one memory communicatively coupled to the at least one processor and storing instructions that upon execution by the at least one processor cause the apparatus to perform operations comprising:
presenting, in response to a received video editing instruction, a video editing interface, wherein the video editing interface is configured to enable a selection of an image and a selection of an audio;
determining a target audio and a target image in response to receiving input via the video editing interface;
obtaining, for each of audio frames of the target audio, an audio parameter corresponding to the audio frame;
generating, for each of the audio frames, a spectrogram corresponding to the audio frame based on the obtained audio parameter;
generating, based on the generated spectrogram and the target image, a plurality of video frame images, wherein each of the plurality of video frame images corresponds to one of the audio frames, and each of the plurality of video frame images comprises an image of the spectrum corresponding to the one of the audio frames; and
performing, based on the plurality of video frame images and the target audio, video encoding to generate a target video file.

10. The apparatus according to claim 9,
wherein the generating, for each of the audio frames, a spectrogram corresponding to the audio frame based on the obtained audio parameter comprises:
sampling the target audio based on a preset sampling frequency to obtain an audio parameter corresponding to each of audio frames after sampling; and
generating, for each of the audio frames after sampling, a spectrogram corresponding to the audio frame after sampling by performing Fourier transform on the audio parameter corresponding to the audio frame after sampling.

11. The apparatus according to claim 9,
wherein the generating, for each of the audio frames after sampling, a spectrogram corresponding to the audio frame after sampling comprises:
determining, for each of the audio frames, an amplitude of the audio frame;
determining, for each of the audio frames, a spectrum envelop corresponding to the spectrogram based on the amplitude of the audio frame, to obtain a plurality of spectrum envelopes; and
for each of the plurality of spectrum envelopes, combining the spectrum envelope with the spectrum corresponding to the spectrum envelop, to obtain a plurality of combined spectrograms.

12. The apparatus according to claim 9,
wherein the generating, based on the generated spectrogram and the target image, a plurality of video frame images, wherein each of the plurality of video frame images corresponds to one of the audio frames and comprises the spectrum corresponding to the one of the audio frames comprises:
blurring the target image to obtain a blurred target image;
obtaining a target region of the target image to obtain a target region image;
combining the target region image with the spectrogram of each of the audio frames to obtain a plurality of combined images; and
using each of the plurality of combined images as a foreground and the blurred target image as a background to generate a plurality of video frame images each comprising the spectrogram.

13. The apparatus according to claim 12,
wherein the obtaining a target region of the target image to obtain a target region image comprises:
determining a region that is in the target image and that corresponds to a target object in the target image; and
obtaining, based on the determined region, a region that comprises the target object and that has a target shape, as the target region image.

14. The apparatus according to claim 12,
wherein before the combining the target region image with the spectrogram of each of the audio frames, the at least one memory communicatively coupled to the at least one processor and storing instructions that upon execution by the at least one processor also cause the apparatus to:
performing color feature extraction on the blurred target image to obtain color features of respective pixels of the blurred target image;
performing a weighted average on the color features of the respective pixels to determine a color of the blurred target image; and
setting the determined color of the blurred image as a color of the spectrogram.

15. The apparatus according to claim 12,
wherein the spectrogram is a spectral histogram, and the combining the target region image with the spectrogram of each of the audio frames to obtain a plurality of combined images comprises:
arranging the spectral histogram around the target region image to form the plurality of combined images, wherein a height of a spectral column in the spectral histogram represents an amplitude of a corresponding one of the audio frames, and an angle of the spectral column in the spectral histogram relative to an edge of the target region image represents a frequency of the corresponding audio frame.

16. The apparatus according to claim 12,
wherein the using each of the plurality of combined images as a foreground and the blurred target image as a background to generate a plurality of video frame images each comprising the spectrogram comprises:
obtaining a relative positional relationship between the foreground and the background in one of the plurality of video frame images corresponding to an adjacent audio frame of the target audio frame; and
generating, based on the obtained relative positional relationship, a video frame image corresponding to the target audio frame, where a presentation position of the foreground in the video frame image corresponding to the target audio frame is rotated by a present angle relative to a representation position of the foreground in the video frame image corresponding to the adjacent audio frame.

17. A non-transitory storage medium bearing computer-readable instructions that upon execution on a computing device cause the computing device at least to perform operations comprising:

presenting, in response to a received video editing instruction, a video editing interface, wherein the video editing interface is configured to enable a selection of an image and a selection of an audio;
determining a target audio and a target image in response to receiving input via the video editing interface;
obtaining, for each of audio frames of the target audio, an audio parameter corresponding to the audio frame;
generating, for each of the audio frames, a spectrogram corresponding to the audio frame based on the obtained audio parameter;
generating, based on the generated spectrogram and the target image, a plurality of video frame images, wherein each of the plurality of video frame images corresponds to one of the audio frames, and each of the plurality of video frame images comprises an image of the spectrum corresponding to the one of the audio frames; and
performing, based on the plurality of video frame images and the target audio, video encoding to generate a target video file.

* * * * *